United States Patent [19]

Koyanagi et al.

[11] Patent Number: 5,627,815

[45] Date of Patent: May 6, 1997

[54] PRECISION MACHINING METHOD PRECISION MACHINING APPARATUS AND DATA STORAGE APPARATUS USING THE SAME

[75] Inventors: Hajime Koyanagi, Koshigaya; Sumio Hosaka, Hinodemachi; Ryo Imura, Tokorozawa, all of Japan

[73] Assignee: Hitachi, Ltd., Japan

[21] Appl. No.: 521,925

[22] Filed: Aug. 31, 1995

Related U.S. Application Data

[62] Division of Ser. No. 120,541, Sep. 14, 1993, Pat. No. 5,471,064.

[30] Foreign Application Priority Data

Sep. 14, 1992 [JP] Japan .................................. 4-244508

[51] Int. Cl.$^6$ ........................... G11B 9/00; G21K 5/10
[52] U.S. Cl. .................. 369/126; 369/101; 250/306; 250/492.2; 250/492.3; 365/118; 365/114
[58] Field of Search ...................... 369/101, 126, 369/124, 116, 100, 99; 250/492.3, 306, 492.2; 365/118, 114, 151

[56] References Cited

U.S. PATENT DOCUMENTS

| | | | |
|---|---|---|---|
| 4,343,993 | 8/1982 | Binnig et al. | |
| 4,829,507 | 5/1989 | Kazan et al. | 369/126 |
| 4,878,213 | 10/1989 | Kazan et al. | 369/126 |
| 4,896,044 | 1/1990 | Li et al. | 250/492.2 |
| 4,907,195 | 3/1990 | Kazan et al. | 365/118 |
| 5,038,322 | 8/1991 | Van Loenen | 365/114 |
| 5,043,578 | 8/1991 | Güethner et al. | 250/307 |
| 5,047,649 | 9/1991 | Hodgson et al. | 250/492.2 |
| 5,144,148 | 9/1992 | Eigler | 250/492.3 |
| 5,210,425 | 5/1993 | Delawski et al. | 250/492.2 |
| 5,214,282 | 5/1993 | Yamaguchi et al. | 250/492.2 |
| 5,216,631 | 6/1993 | Shiwa | 365/174 |
| 5,283,437 | 2/1994 | Greschner et al. | 250/306 |
| 5,313,451 | 5/1994 | Yagi et al. | 369/126 |
| 5,338,932 | 8/1994 | Theodore et al. | 250/306 |
| 5,343,460 | 8/1994 | Miyazaki et al. | 369/126 |

FOREIGN PATENT DOCUMENTS

| | | |
|---|---|---|
| 61-80536 | 4/1986 | Japan. |
| 1-245445 | 9/1989 | Japan. |

OTHER PUBLICATIONS

"Near-Field Optical Scanning Microscopy with Tunnel Distance Regulation", Urs Dürig, Dieter Pohl & Flavio Rohner, IBM J. Res. Develop. vol. 30, No. 5, Sep. 1986.

"Tunneling Acoustic Microscope", K. Takata, T. Hasegawa, S. Hosaka, S. Hosoki and T. Komoda, Central Research Laboratory, Hitachi Ltd., Kokubunji, Tokyo 185, Japan, Appl. Phys. Lett. 55(17), 23 Oct. 1989.

Primary Examiner—Loha Ben
Attorney, Agent, or Firm—Evenson, McKeown, Edwards & Lenahan P.L.L.C.

[57] ABSTRACT

A method and apparatus for precision machining a surface suitable for use as a data recorder, using a scanning probe microscope (SPM) capable of observing an electrically insulating surface. The SPM includes a probe which comprises a tip having a pointed end, and also including a conductive layer applied on a surface of the tip. The tip is brought into close proximity to the surface which is to be machined and a machining voltage is applied between the tip and the surface to machine the surface.

12 Claims, 4 Drawing Sheets

PRECISION MACHINING METHOD PRECISION MACHINING APPARATUS AND DATA STORAGE APPARATUS USING THE SAME

This application is a division of application Ser. No. 08/120,541, filed Sep. 14, 1993 now U.S. Pat. No. 5,471,064.

BACKGROUND AND SUMMARY OF THE INVENTION

The present invention relates to a precision machining device suitable for use in a data recorder arrangement to achieve increased data recording density. More particularly, the invention relates to a machining device which uses a scanning probe microscope capable of observing substances ranging from conducting materials to insulating materials, as well as to a recording device for recording and reproducing large amounts of data at a recording density, for example, on the order of tera-bit per square inch.

The use of magnetic and optical disks to record data is well known. Due, however, to factors such as spacing required between the recording head and the recording medium, a practical limit on detected output, and a diffraction limit, it has been considered that about 100 $Gb/in^2$ is a limit to a recording density. If recording density continues to grow at the present rate, it is expected that the limit of recording density will be reached early in the twenty-first century. Therefore, the development of a new data recording technology of the $Tb/in^2$ order toward the twenty-first century has been urged.

Under such circumstances, precision machining technology using a scanning probe microscope (SPM) is drawing attention. One such machining arrangement uses a scanning tunneling microscope (STM), such as disclosed in U.S. Pat. No. 4,343,993.

A surface machining and recording device using the STM is disclosed in Japanese Patent Laid-Open No. 08536/1986. In that device, the recording method consists of adsorbing atoms on a crystal surface or adsorbing atoms from the crystal surfaces by means of an electron beam generated by a conventional electro-optical device such as employed in an electron microscope, or by utilizing a tunnel current from the tip of the STM. The presence and absence of adsorbed atoms are allowed to correspond to "1" and "0" of recorded data. The reading method consists of reading the presence or absence of the adsorbed atoms by using the STM.

The above-mentioned prior art is characterized by a number of problems. First, the precise machining technology using the STM requires a clean sample surface at low temperatures, in a controlled environment which is free from external effects, such as a deep vacuum. Furthermore, prior art devices using STM require the use of a conductive material as a recording medium. That is, insulating materials cannot be utilized as a recording medium, which poses a significant limitation on the selection of a medium.

Another surface machining device using STM technology is described in "Physical review letters" Vol. 65, No. 19, pp. 2418–2412. In this prior art, the machining process is performed at standard atmospheric conditions, but the sample is expensive gold. Although the recording medium is generally handled in the ambient atmosphere, and many kinds of conductive material such as Al or Si can be used, such materials easily oxidize in the air, creating an insulating surface.

It is thus necessary to develop a method and apparatus that can write data by precision machining on a substrate having an electrically insulating surface, at recording densities on the order of $Tb/in^2$. While such a high recording density requires a recording medium which has a large flat surface, the technology to provide a semiconductor substrate such as Si having a large flat face is established. And such substrate is suitable for use as a commercial recording medium, because it is relatively inexpensive.

One object of the present invention, therefore, is to provide a fine-machining technology capable of achieving a precision on the order of nanometers (an atomic level), and of machining an insulating material. In, particular, it is an object of this invention to provide such a data recording technology which is capable of writing and reading on any substances ranging from electrically conducting materials to electrically insulating materials.

In the above-mentioned Japanese patent document, the recording tip must be brought closer to the surface of the recording medium during data recording than during the ordinary operation of such a device, thus increasing data recording time in applications where high-speed operation is required.

Another object of the present invention is to provide a data recording technology which is capable of stably operating at a standard atmospheric pressure and at a normal temperature, and which is capable of accomplishing high-density recording with a recording unit on the order of nm (atomic level), at high speed.

SUMMARY OF THE INVENTION

In order to accomplish the above objects, the surface machining and recording apparatus according to present invention utilizes a Scanning Probe Micrscope (SPM) which is capable of observing any substances, from electrically conducting materials to electrically insulating materials. An electrically insulated tip of the SPM is coated with an electrically conducting material, to provide it with electrically conducting property, and a voltage source applies a voltage between the tip and the surface of the sample. During machining, the coating material applied to the tip serves as a source for feeding a substance onto the surface of the sample, in a manner described in greater detail hereinafter, with a precision on the order of nm.

The above-mentioned operation thus provides recording technology that is capable of recording data in an atmosphere at the normal temperature at a high speed, and which can stably maintain a recording density on the order of nm.

Other objects, advantages and novel features of the present invention will become apparent from the following detailed description of the invention when considered in conjunction with the accompanying drawings.

DETAILED DESCRIPTION OF THE DRAWINGS

Figure 1:
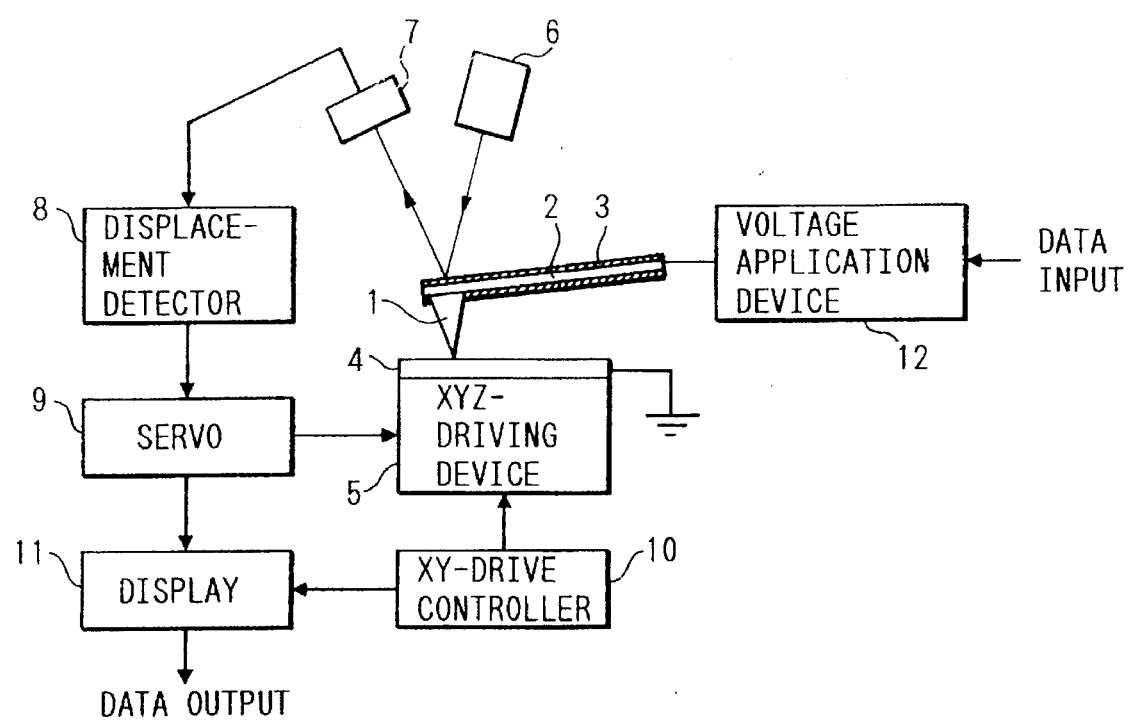
FIG. 1 is a schematic diagram of an apparatus for finely machining a surface using an Atomic Force Microscope (AFM), according to the present invention.

FIG. 1 is a diagram which schematically illustrates an apparatus for precision machining a surface, suitable for use as a data storage apparatus, using an atomic force microscope (AFM) technology. AFM technology is known to those skilled in the art, and is described for example, in Physical Review Letters, Vol. 56, 1986, p. 930; and a recording apparatus using AFM for detecting the spacing between the probe and the recording medium is disclosed in Japanese Patent Laid-Open No. 245445/1989.

In AFM devices of this type, as shown in FIG. 1, the probe comprises of a tip 1 that is provided at an end of a cantilever 2. When the probe tip 1 and the sample 4 are placed very close together (for example less than 5Å), an atomic force exists between the atoms at the end of the tip and the atoms at the surface of the sample 4. (The strength of the atomic force depends on the distance between the probe and the sample surface.) The cantilever 2 is bent by the atomic force.

Numeral 6 indicates a laser beam source, such as a semiconductor laser, which directs a laser beam onto the back surface of the cantilever 2, which has a reflective surface. A sensor such as photo detector 7 senses displacement of the laser beam reflected by the back surface of the cantilever 2. If the cantilever 2 is bent, the reflected laser beam is moved, and displacement detector 8 generates a signal indicating the displacement of the cantilever 2 based on the output signal of the sensor 7. Thus, the force acting between the atoms at the end of the tip 1 and the atoms on the surface of the sample 4 is detected based on the output of the displacement detector 8.

The output signal of the displacement detector 8 is input into a servo control circuit 9, which generates a control signal that controls an xyz-driving device 5 that holds a sample 4 so that the bending of the cantilever 2 (in the z direction) is maintained constant. (That is, spacing between the end of the tip 1 and the surface of the sample 4 is maintained constant.) The xyz-driving device 5, which may be, for example, a combination of a voice coil motor and a piezo device such as is commonly used in STM technology, is also controlled by xy-drive controller 10 for x-y direction scanning. The surface image is obtained according to the motion of a sample 4, and is indicated by a display 11.

According to the invention, an electrically conducting property is imparted to the probe, and a voltage source 12 is provided to apply a machining voltage between the tip 1 and the sample 4, in order to add the function of machining the surface of the sample 4. The cantilever 2 has a length of several hundred μm, and the end of the tip 1 is sharpened to a radius of curvature of several hundred nm by means of a focused ion beam technique which is well known. The probe is usually composed of an electrically insulating material such as $SiO_2$, $Si_3N_4$, or quartz. An electrically conducting material such as Au and Ga is coated on the surface on the tip 1 to provide an electrically conducting layer 3 in order to feed an electric charge to the end of the tip 1. During machining, atoms from the coating material are deposited by adsorption onto the surface of the sample 4, in a manner described below. The pointed tip end serves as both a machining tool and a detecting probe for acquiring a sample surface image, at the same time. Thus present invention makes it possible to obtain very fine machining operation on sample surface.

In order to achieve the deposit of an atom on the surface of the sample 4, the conducting material coated on the probe tip 1, should be easily evaporated under a voltage, such as Au, Ga, Pt or In. On the other hand, in order to achieve the desorption of an atom from the surface of the sample 4, the conducting material should be harder to evaporate under a voltage than the material of the sample 4, such as W or C.

It should be noted that an increase in the thickness of the coating increases the radius of curvature at the end of the tip..and hence decreases the precision of machining. Therefore, the coating should have sufficient thickness that the electrically conducting property is imparted, yet the size of machining does not increase. The thickness should be about 50 nm when coated with Au. It Should also be noted, of course, that although the tip 1 is made by the combination of conductive material and insulating material in the above example, it is also possible to make tip 1 of a conductive material only.

Next, described below is the operation of the fine machining or recording process. The gap between the end of the tip 1 and the surface at the sample 4 is maintained, for example, at 0.3 nm by the servo control 9. The voltage source 12 applies a machining voltage between the tip 1 and the sample 4, in order to machine the surface of the sample 4. The proper magnitude of the machining voltage varies to some extent with different combinations of the coating material and the sample material. When the coating material is Au and sample material is graphite with a cleavage plane, however, the voltage to be applied will be from several volts to several tens of volts. The application of a pulse-like voltage makes it possible to form pits or mounds on the surface of the sample, in the manner described below in connection with FIG. 7.

Figure 6A:
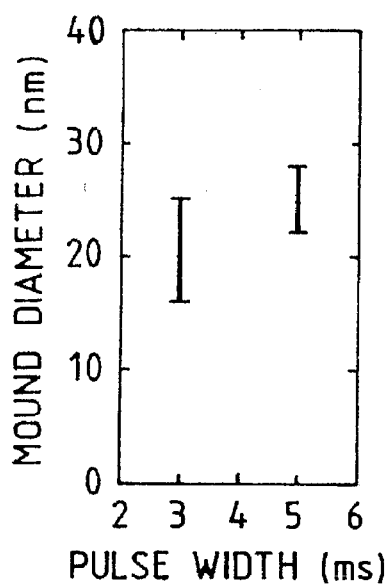
FIGS. 6a and 6b are graphs that show the relationship between pulse width, pulse voltage, and mound diameter.
Figure 6B:
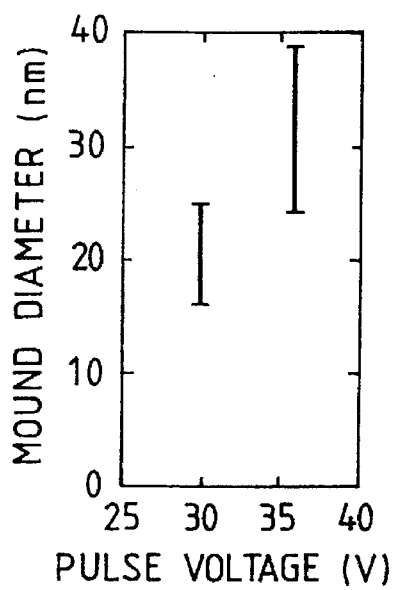

FIGS. 6a and 6b show the relationship between the pulse width, pulse voltage, and mound diameter using $SiO_2$ sample and Au coated probe. FIG. 6a, in particular, shows the relationship between the pulse width and the mound diameter when 30 volts pulse voltage is applied to tip 1, while FIG. 6b shows the relationship between the pulse voltage and the mound diameter when the pulse width is 3 msec. As shown in FIGS. 6a and 6b, the application of a rectangular voltage pulse having a duration of several msec makes a mound having a diameter in the range of less than 50 nm. It is thus possible to record the data by modulation of the voltage pulse based on the input recording data, as shown in FIG. 1, and thereby achieve a data recording density on the order to terabytes/square inch.

Figure 7A:
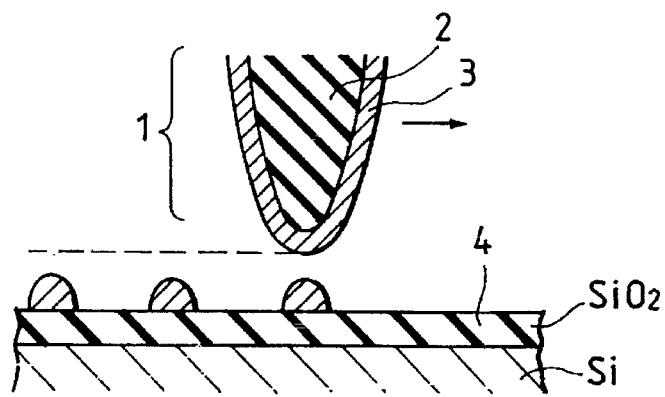
FIGS. 7a and 7b are diagrams that show the principles of the recording and reproducing method of present invention.

When a voltage is applied between the tip 1 and sample 4, the atoms at the surface of the sample, or at the end of the tip (or both), are ionized by a process known as field evaporation. Ionized atoms are then transferred between tip and sample by the applied voltage, depending on its polarity. Thus, it becomes possible to obtain pits or mounds on the surface of sample 4. FIG. 7a shows the principle for the deposit of a Au mound on the oxidized Si sample 4. The tip 1 is controlled as described previously, to maintain the constant gap (indicated by the dashed line), and scans the surface of the sample 4 during the recording operation. Such control is necessary in order to avoid collision of the tip 1 with the sample 4, and to assure the proper formation of a mound or pit. In FIG. 7a, field evaporated tip atoms are deposited on the surface of the sample 4, and make gold mounds.

Figure 7B:
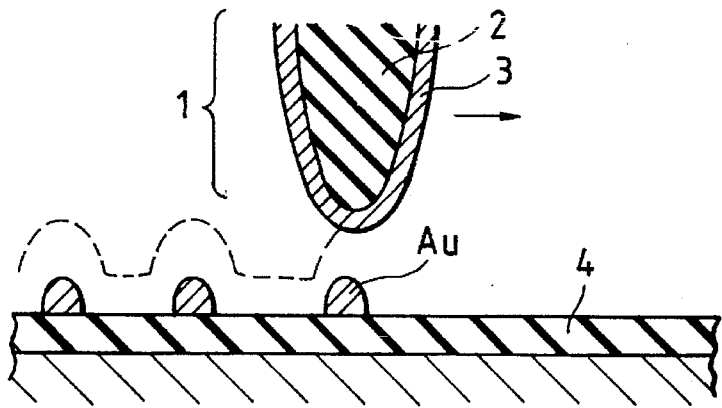

Next, the data reading process is described below. FIG. 7b shows the principle for reading recorded data. According to the movement of the tip 1, the force acting between the tip 1 and the surface of the sample 4 is detected. Based on the displacement of the cantilever 2 detected by displacement detector 8, the servo control 9 controls the xyz-driving device 5 so as to maintain the displacement on the cantilever 2 constant. That is, the gap between the sample 4 and the tip 2 (including the mounds formed on its surface, as indicated by dashed line), is maintained constant, and the atomic force between them is maintained constant also. The servo signal is then used to generate an image of the surface of the sample 4 in a conventional manner. This image can be indicated on the display 11. And also, it is possible to obtain reproducing output data based on the modulation of the image signal.

Figure 2:
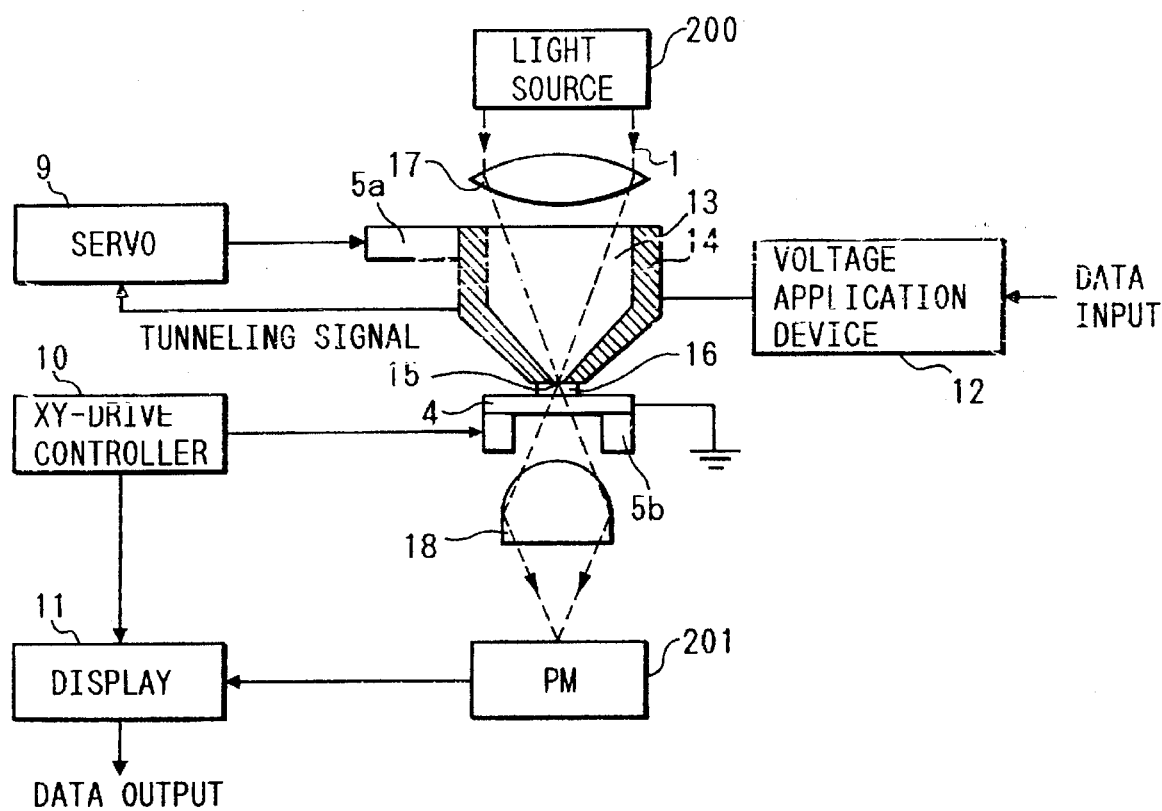
FIG. 2 is a schematic diagram of an apparatus for finely machining a surface using a Near Field Optical Scanning Microscope (NFOS), according to the present invention.

FIG. 2 is a schematic diagram which shows an apparatus for finely machining a surface (including data recording as described above) by using a known near field optical scanning microscope (NFOS), such as described, for example, in IBM Journal of Research and Development, Vol. 30,1986, p. 478.

In this embodiment, the probe is constituted by a pinhole 15, which is as small as about 20 nm in diameter, formed by bonding a thin aluminum film 14 to a quartz chip 13 and by pressing the end thereof onto the surface of a glass. A laser source 200 and optical system such as lens 17 are provided to direct a laser beam 100 onto the probe. The laser beam 100 coupled into the quartz chip 13 leaks out onto the surface of the sample 4 through the pinhole 15 at the end. An image of the sample 4 is transmitted by optical system 18, and a photomultiplier 201 detects the image of the surface of the sample 4. An x-y drive controller 10 controls the X-y driver 5b, and moves the sample 4 in the horizontal direction. A display 11 provides a three dimensional image of sample 4, based on the output of x-y drive controller 10 and the photomultiplier 202.

The light outgoing through the pinhole 15 readily diverges. Therefore, the gap between the pinhole 15 and the sample 4 should be maintained at less than 10 nm during data reading operation. For this purpose, and to provide a tunneling current, a protrusion 16 (also formed of aluminum) is provided at the end of the probe. The tunneling current is input into a servo control circuit 9 that controls z driving device 5a such as a piezoelectric positioner. And the gap is thus controlled in response to the tunnel current that flows between the protrusion 16 and the sample 4. The voltage source 12 applies a machining voltage between the protrusion 16 and the sample 4 in order to machine or record data on the surface of the sample 4, by the field evaporation process described previously.

Figure 3:
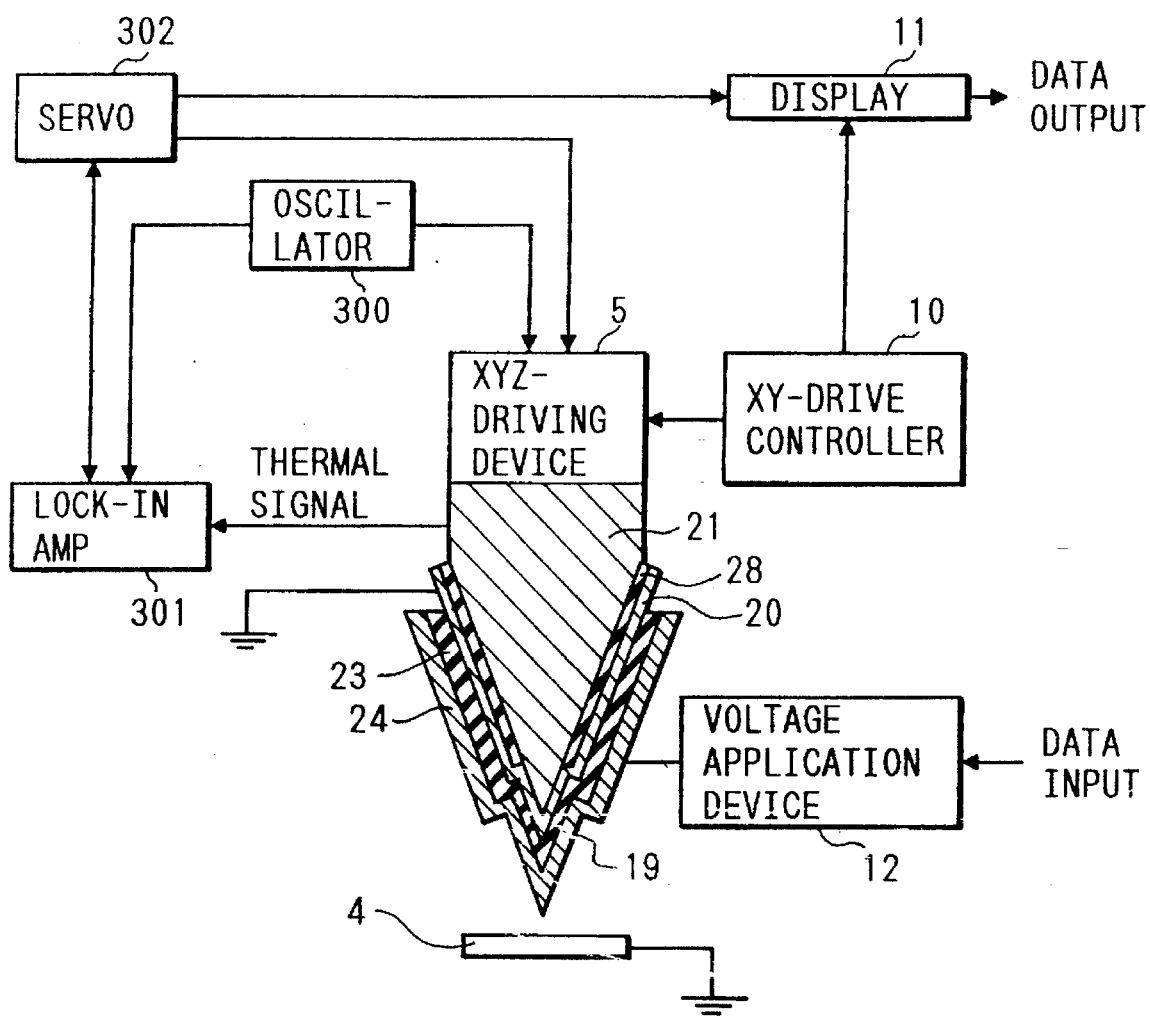
FIG. 3 is a schematic diagram of an apparatus for finely machining a surface by using a Scanning Thermal Profiler (STP), according to the present invention.

FIG. 3 is a diagram schematically illustrating an apparatus for fine surface machining (or a data storage) by using a scanning thermal profiler (STP), such as described, for example, in Applied Physics Letters, Vol. 49, 1986, p. 1587.

In such an arrangement, the probe consists of a temperature sensor of a thermocouple 19 having the shape of a sharp end portion. This probe is made to have dimensions on the order of 100 nm, and has an insulator 28 interposed between conical conductors 20 and 21. The thermocouple 19 produces a temperature dependant voltage which can be sensed at the other end of the probe across the two conductors 20 and 21. The probe is moved in three dimensions by an xyz-driving device 5.

The temperature of the tip as it is heated varies with the heat conduction between the tip and the sample. Since the heat conduction varies rapidly according to the gap between probe and surface of the sample 4: it is possible to obtain an image of the surface of the sample 4 based on the thermal voltage signal. To avoid the problem of DC drift in the thermal signal, the probe is modulated in the Z-direction at a frequency of about 1 kHz by a modulator 300. The thermal signal and the modulator output are input into a lock-in amp 301. Thus, a signal that indicates the gap between the surface of the sample 4 and the probe can be obtained by the lock-in amp 301. The output of the lock-in amp 301 is input to the servo circuit 302, that controls the z direction movement so as to maintain the gap constant. The probe is also scanned by the XY-drive controller 10 to obtain the 3 dimensional image of the sample 4. Therefore, a surface image of the sample 4 is obtained by controlling the temperature to a constant value by a servo 302, and is indicated on a display 11. Recorded data such as a mound or pit on the surface of the sample 4 is reproduced based on the modulation of the image signal of the surface of the sample 4.

In order to achieve machining of the surface (or recording of data on the surface) according to the invention; a second insulating layer 23 is provided on the surface of the tip, and an additional conducting layer 24 is provided thereon. The voltage source 12 applies a machining voltage between the probe and the sample 4, in order to machine the surface of the sample 4. It is thus possible to make a mound or pit indicating data by modulating the machining voltage based on the data.

Figure 4:
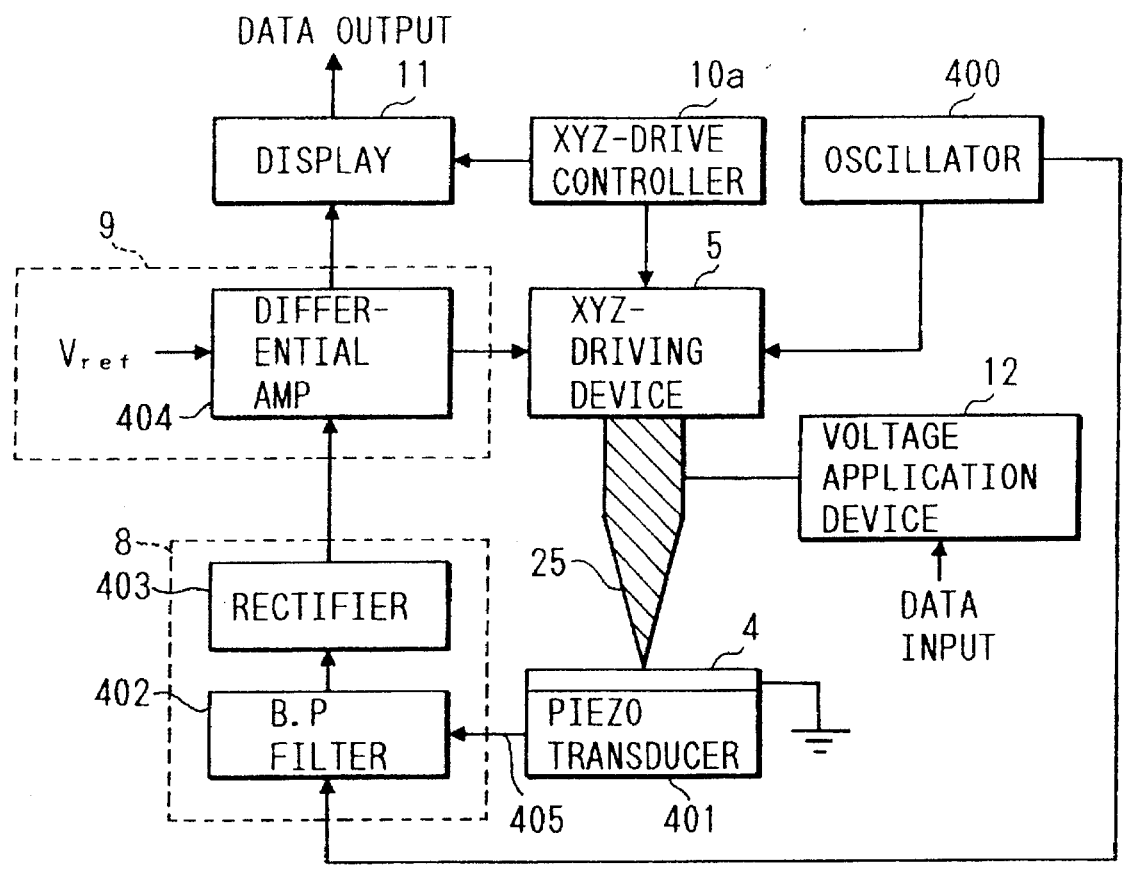
FIG. 4 is a schematic diagram of an apparatus for finely machining a surface by using a Tunnelling Acoustic Microscope (TAM), according to the present invention.

FIG. 4 schematically illustrates an apparatus for finely machining the surface (including data storage) by using a tunneling acoustic microscope (TAM), such as disclosed in Physical Review Letters, Vol. 55, 1989, p. 1718.

In such devices, the probe consists of a tip 25 having a sharp end similar to that of the STM. The tip 25 may be made of an insulating material which is coated with an electrically conducting material, or it may be made of an electrically conducting material to impart the function of machining the surface. A sample 4 is bonded on a piezoelectric transducer 401. The tip 25 is vibrated in the z direction by an xyz-driving device 5 in response to a sinusoidal voltage applied by oscillator 400. As the tip 25 approaches the sample 4, vibration of the tip is transmitted to the sample 4 and to the piezoelectric transducer 401. The output voltage 405, is thus sensitive to the distance between the tip 25 and the sample 4. After being amplified, the transducer output 405 is filtered by a bandpass filter 402 tuned to the tip frequency. The output is then rectified by rectifier 403. A servo system 9 comprises a differential amplifier 404 and a reference voltage source Vref. The output signal from differential amplifier 404 controls the xyz drive device 5 to keep the acoustic signal equal to Vref. Thus, an image of the surface of the sample 4 is detected and indicated and indicated by display 11 in the same manner as explained in the embodiments of FIGS. 1 to 3.

A voltage application device 12 is provided to apply a machining voltage between the tip 25 and the sample 4 in order to machine the surface of the sample 4.

Figure 5A:
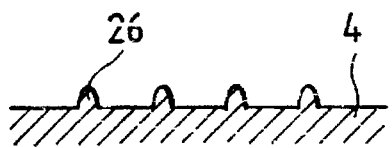
FIGS. 5a, 5b and 5c are diagrams which illustrate schematically a recording surface which has been encoded by means of the method according to the present invention.
Figure 5B:
Figure 5C:
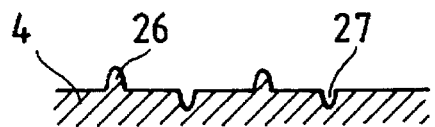

In FIGS. 5a to 5c, the operating principle of the data recording method according to the invention is explained. A pulse-like voltage is applied between the tip and the sample in order to form a protruding structure 26 or a recessed structure 27 at the surface of the sample 4. Application of a 22 msec −24V pulse to the tip having a Au surface layer can make a mound on the graphite whose diameter is 20 nm. Application of a 5 msec −30V pulse to the tip having Au surface layer can make a mound on $SiO_2$ whose diameter is 20 nm. The mound or pit having diameter of less than 25 nm makes it possible to record information in $Tb/in^2$ density. The selection of the material of tip surface and sample surface, and pulse voltage polarity determine whether a mound or pit is formed on the surface of the sample. The presence or absence of protruding structure 26 or the presence or absence of recessed structure 27 is allowed to correspond to a "1" or "0" recording unit thereby recording data. By using both recessed and protruding structures, furthermore, it is possible to make a ternary recording.

The invention may be embodied in other specific forms without departing from the spirit or essential characteristics thereof. The present embodiment is therefore to be considered in all resects as illustrative and not restrictive, the scope of the invention being indicated by the appended claims rather Than by the foregoing description and all changes which come within the meaning and range of equivalency of the claims are therefore intended to be embraced therein.

We claim:

1. Method of recording data in a recording medium comprising steps of:

providing a tip having a pointed end, at least a surface layer of said tip being made from a conductive material;

moving said tip in close proximity to a surface of the recording medium in response to a signal indicating distance between the tip and the surface of the recording medium generated by a scanning probe microscope capable of observing an electrically insulating surface; and removing or depositing atoms on the surface of the recording medium by applying a voltage between said tip and the surface of the recording medium in response to input data, as to make a mound or pit indicating said input data.

2. Method according to claim 1, wherein said input signal comprises data to be recorded on said surface of said recording medium.

3. Method according to claim 1, wherein the conductive material is selected from at least one of the group of Au, Ga, Pt, Ir, W and C.

4. Method according to claim 1, wherein the recording medium is graphite or Si.

5. Method according to claim 1, wherein applied voltage is less than 100 mV.

6. Method according to claim 1, wherein applied voltage is a pulse whose width is less than 10 msec.

7. Method of reading data recorded in a medium by a process which forms mounds and pits in an insulating surface thereof, said mounds and pits having a diameter in the range of less than 50 nm, said method comprising steps of:

using a scanning probe microscope to detect at least one of the mounds and pits;

generating a detection signal in response to detection of said mounds and pits; and reproducing data based on modulation of the detected signal.

8. Method according to claim 7, wherein said scanning probe microscope is one of: Atomic Force Microscope, Near Field Optical Scanning Microscope, Scanning Thermal Profiler and Tunnelling Acoustic Micrcscope.

9. Method of recording information in a medium in response to an input information signal, comprising the steps of:

providing a medium comprising an electrically insulative surface layer formed on an electrically conductive layer;

providing a probe having a pointed tip projecting therefrom, said pointed tip having a surface layer comprising an electrically conductive material;

moving said pointed tip into close proximity to said surface layer of said medium; and selectively causing ionization of atoms in at least one of an end of said surface layer of said pointed tip, and a portion of said surface layer of said medium in an area adjacent said pointed tip, by applying a voltage between said pointed tip and said electrically conductive layer of said medium in response to said input information signal, whereby atoms are transferred between said electrically conductive surface layer of said pointed tip and said electrically insulative surface layer of said medium in accordance with said input information signal.

10. Method according to claim 9, wherein said ionization of atoms is caused by a field evaporation process.

11. Method according to claim 9, wherein said step of causing ionization forms protrusions or recesses in said insulative surface layer of said medium.

12. Method according to claim 9, wherein said electrically insulative surface layer of said medium is $SiO_2$ and said electrically conductive layer of said medium is Si.

* * * * *